US006361817B1

(12) United States Patent
Sekula et al.

(10) Patent No.: US 6,361,817 B1
(45) Date of Patent: Mar. 26, 2002

(54) LOW CALORIE NUT BUTTERS

(75) Inventors: Bernard Charles Sekula, Lebanon Township; Jacenty W. Golebiowski, Middletown, both of NJ (US)

(73) Assignee: BestFoods, Englewood Cliffs, NJ (US)

( * ) Notice: Subject to any disclaimer, the term of this patent is extended or adjusted under 35 U.S.C. 154(b) by 0 days.

(21) Appl. No.: 09/466,471

(22) Filed: Dec. 17, 1999

(51) Int. Cl.[7] .............................. A23D 9/02; A23L 1/38

(52) U.S. Cl. ........................ 426/633; 426/601; 426/611

(58) Field of Search ................................ 426/633, 603, 426/607, 601, 611

(56) References Cited

U.S. PATENT DOCUMENTS

| | | | |
|---|---|---|---|
| 3,954,976 A | | 5/1976 | Mattson et al. |
| 4,005,195 A | | 1/1977 | Jandacek |
| 4,005,196 A | | 1/1977 | Jandacek et al. |
| 4,582,715 A | | 4/1986 | Volpenhein |
| 4,840,815 A | | 6/1989 | Meyer et al. |
| 4,861,613 A | | 8/1989 | White et al. |
| 4,927,658 A | | 5/1990 | Klemann et al. |
| 4,983,413 A | | 1/1991 | Meyer et al. |
| 5,006,351 A | | 4/1991 | Klemann et al. |
| 5,006,360 A | | 4/1991 | Howard et al. |
| 5,008,126 A | | 4/1991 | Klemann et al. |
| 5,059,443 A | | 10/1991 | Ennis et al. |
| 5,063,075 A | | 11/1991 | Yarger et al. |
| 5,064,678 A | | 11/1991 | Klemann et al. |
| 5,077,073 A | | 12/1991 | Ennis et al. |
| 5,093,142 A | | 3/1992 | Klemann et al. |
| 5,118,448 A | | 6/1992 | Cooper |
| 5,139,807 A | | 8/1992 | Klemann et al. |
| 5,142,071 A | | 8/1992 | Kluesener et al. |
| 5,142,072 A | | 8/1992 | Stipp et al. |
| 5,190,782 A | | 3/1993 | Yarger et al. |
| 5,190,783 A | | 3/1993 | Klemann et al. |
| 5,219,604 A | | 6/1993 | Klemann et al. |
| 5,230,913 A | | 7/1993 | Klemann |
| 5,230,919 A | | 7/1993 | Walling et al. |
| 5,240,726 A | | 8/1993 | Zook et al. |
| 5,258,197 A | | 11/1993 | Wheeler et al. |
| 5,266,346 A | | 11/1993 | Klemann et al. |
| 5,268,192 A | | 12/1993 | Zook et al. |
| 5,273,772 A | | 12/1993 | Cooper |
| 5,304,665 A | | 4/1994 | Cooper et al. |
| 5,308,634 A | | 5/1994 | Cooper |
| 5,338,564 A | | 8/1994 | Meyer et al. |
| 5,366,753 A | | 11/1994 | Meyer et al. |
| 5,374,446 A | | 12/1994 | Ferenz et al. |
| 5,376,398 A | | 12/1994 | Cooper et al. |
| 5,387,429 A | | 2/1995 | Cooper |
| 5,389,392 A | | 2/1995 | Cooper |
| 5,399,371 A | | 3/1995 | Harris |
| 5,399,729 A | | 3/1995 | Cooper et al. |
| 5,427,815 A | | 6/1995 | Ferenz |
| 5,431,949 A | | 7/1995 | Meyer et al. |
| 5,512,313 A | | 4/1996 | Cooper et al. |
| 5,516,544 A | | 5/1996 | Sekula et al. |
| 5,645,881 A | | 7/1997 | Tancibok et al. |
| 6,010,737 A | * | 1/2000 | Meade |

FOREIGN PATENT DOCUMENTS

| | | |
|---|---|---|
| EP | 0 236 288 | 2/1987 |
| EP | 0 415 635 | 8/1990 |
| EP | 0 571 218 | 5/1993 |
| EP | 0 571 219 | 5/1993 |
| WO | WO 95/00034 | 1/1995 |
| WO | WO 97/22260 | 6/1997 |

* cited by examiner

*Primary Examiner*—Anthony J. Weier
(74) *Attorney, Agent, or Firm*—Norris, McLaughlin & Marcus

(57) ABSTRACT

A reduced calorie and reduced fat nut butter composition, particularly a peanut butter. Fatty acid-esterified propoxylated glycerin compositions are used and incorporated into the nut butter compositions as a roasting medium or otherwise. The fatty acid-esterified propoxylated glycerin composition have a Iodine Value of less than or equal to about 10 and an average number of fatty acid acyl group carbons per propoxylation number of about 7 to about 15. The nut butter compositions do not exhibit the undesirable side effects of gastrointestinal intolerance or anal leakage and do not require stabilizes.

15 Claims, No Drawings

LOW CALORIE NUT BUTTERS

BACKGROUND OF THE INVENTION

1. Field of the Invention

The present invention has to do with reduced calorie nut butter compositions. More particularly, the invention relates to peanut spreads which are prepared by employing certain fatty acid-esterified propoxylated glycerin compositions as a roasting medium and otherwise. The compositions of the invention have the flavor, texture and organoleptic character of full-calorie nut butter products. The compositions do not exhibit undesirable gastrointestinal side effects such as intolerance and passive leakage through the anal sphincter. Additionally, the nut butter products do not require stabilizers which are necessary for conventional peanut butters, and reduced calorie nut butter compositions known in the art.

2. Description of the Related Art

Peanut butter is a high protein nutritious food but its consumption is believed to be limited by segments of the population who are reducing their caloric intake. Peanut spreads having reduced calories are desirable to consumers but it has been difficult for formulators to maintain the flavor, texture and organoleptic character of full-calorie nut butter products.

European Patent Application No. 89 201590.0 describes a reduced calorie peanut butter made by replacing at least 10% by weight of the peanut oil with medium chain triglycerides. The texture and viscosity are said to be on parity with a full fat peanut butter, but there is little fat or caloric reduction because medium chain triglycerides contain about 90% of the calories of peanut oil triglycerides (8–9 calories per gram).

A reduced calorie nut butter paste is made according to U.S. Pat. No. 5,268,192 by combining a partially defatted nut flour with a low calorie triglyceride, such as described in U.S. Pat. No. 5,258,197. The textural quality of this product is said to be on parity with a full fat ground nut paste which is not representative of a full fat peanut butter. Stabilizers, such as vegetable oils with polyglycerol esters of fatty acids, may be present in this nut butter product. The caloric reduction attained with this nut butter product would be minimal because the only ingredient replaced is a 9 calories per gram peanut oil and the triglyceride oil used as a replacement has 5 calories per gram. Thus, the beneficial calorie reduction of the invention is not demonstrated in the reduced calorie nut butter paste made according to U.S. Pat. No. 5,268,192.

Nut butter products comprising low and zero calorie oils such as sucrose polyesters of long chain fatty acids, polyol polyesters of fatty acids and mixed triglycerides made from medium and long chain saturated and/or unsaturated fatty acids as an oil component are discussed in U.S. Pat. No. 5,230,919. These nut butter compositions, generally, require stabilizers, and/or crystal modifiers.

Conventional nut butters and other nut butter compositions known in the art generally require stabilizers, which are usually triglycerides that are solid at room temperature. Examples of stabilizers customarily used with peanut butters are hydrogenated rapeseed oil, or other hydrogenated triglycerides having a high proportion of $C_{20}$ and $C_{22}$ fatty acids. Stabilizers solidify the nut butter in specific crystalline states and keeps the oil from separating from the composition. Separation of oil from the composition affects the organoleptic properties of the nut butter and has a negative impact on the marketability of nut butter compositions. Thus, in conventional nut butters and other known nut butter compositions, stabilizers are necessary, however, the need for stabilizers results in added costs to make the composition, additional process steps and additional caloric content of the nut butter compositions.

Reduced calorie food compositions containing fat-type organoleptic ingredients are known wherein an esterified epoxide-extended polyol is employed as a full or partial replacement for vegetable oils and fats. Fat substitutes of this type are disclosed in U.S. Pat. No. 4,861,613 to White et al. (referred to herein as "White" and incorporated by reference herein in its entirety). However, suitable substances of this type and methods of using them have not previously been identified for use in nut butter compositions.

Applications of the assignee of the invention involving the replacement of conventional fat in comestible products with fatty acid-esterified propoxylated glycerin compositions are currently pending. These applications involve the use of fatty-acid esterified propoxylated glycerin compositions in milk products, Reduced Calorie Reconstituted Milk and Milk Products, Ser. No. 08/572,277 filed on Dec. 13, 1995 and spoonable dressings, Freezable Low-Calorie Spoonable Dressings and Method for Their Production, Ser. No. 09/262,221, filed on Mar. 4, 1999.

Applicants now have found means to identify and employ certain fatty acid-esterified propoxylated glycerin compositions for use as a roasting medium, or otherwise, to prepare nut butters having reduced calories, excellent flavor, texture and organoleptic characteristics and which still provide high protein and nutrition. In addition, these nut butters possess the desirable characteristic that stabilizers are unnecessary in their formulation as a result of the properties resulting from the selection of a fatty acid-esterified propoxylated glycerin composition. The fat component of these compositions do not separate, thus no stabilizers are necessary, and thereby allowing for further calorie reduction. The reduced calorie content resulting from the absence of stabilizers in the composition is in addition to the significant calorie reduction achieved through use of the fatty acid-esterified propoxylated glycerin compositions.

While the present specification makes reference to nut butters and specifically to peanuts and peanut spreads, it is understood that the principles of the invention apply to nuts and seeds other than peanuts, such as cashews, almonds, walnuts, filberts, macadamia nuts, Brazil nuts, pecans, sunflower seeds, sesame seeds and the like. All percentages and ratios set forth herein are on a weight/weight basis unless specifically designated otherwise.

SUMMARY OF THE INVENTION

A reduced calorie nut butter, particularly a peanut spread, having up to about 40% reduced calorie content, compared to conventional nut butter compositions, is produced by using defatted or partially defatted nuts and/or nut flour in a fatty acid-esterified propoxylated glycerin composition. The content of the fatty acid -esterified propoxylated glycerin composition in the reduced calorie nut butter is up to about 30%, ideally from about 15% to about 30%, of the total composition. The caloric reduction is approximately equal to the 9 calories per gram content of fats used in conventional nut butters that are replaced by the fatty acid-esterified propoxylated glycerin. The nut butter also comprises natural and/or artificial sweeteners, carbohydrate solids, salt, flavorants and other additives such as nut chunks and flavored candies and bits. The nut butter, however, neither requires nor contains stabilizers.

DETAILED DESCRIPTION OF THE INVENTION

The fatty acid-esterified propoxylated glycerin compositions (sometimes referred to herein as "EPG" in the singular form and as "EPGs" in the plural form) are made by incorporating propylene oxide (sometimes referred to herein as "oxypropylene" or "PO") groups into a typical triglyceride fat as described in White. The average number of PO groups which are incorporated into a triglyceride is called the propoxylation number. The melting point and other characteristics of the composition can be modified by varying the number of oxypropylene groups, the fatty acid carbon chain length and the level of unsaturation.

It is discovered that EPG compositions having an iodine value less than or equal to about 10 and an average number of fatty acid acyl group carbons per number of PO groups (referred to herein as the "FACN:PO Ratio") of between about 7 to about 15, more preferably between about 9 and about 13 and most preferably between about 10 and about 12 can be used as an oil replacement composition for nut butters. Nut butters comprising EPGs, which can replace up to about 30% of conventional nut oil in nut butter compositions, do not require stabilizers and have acceptable organoleptic characteristics without the undesirable gastrointestinal side effects. Such EPG compositions will have the consistency of shortening to a solid substance at ambient temperature. Particularly preferred embodiments of the invention employ EPGs having a propoxylation number of about 5 synthesized using about 90% hydrogenerated rapeseed and about 10% liquid soybean fatty acids having an Iodine Value about 4 ("EPG-05 9HR/1LS (IV=4)"), and fully hydrogenated (FH) soybean fatty acid-esterified propoxylated glycerin composition having a propoxylation number of 5 ("FHEPG-05").

The EPG compositions useful for the nut butters generally possess the consistency of shortening to a solid substance at ambient temperature and can be called solid EPGs. Ranges of solid fat indices are associated with these EPG compositions, and, as discussed below, ranges of Iodine Values and FACN:PO Ratios are associated with the EPG compositions particularly suitable for the invention.

We have found that careful selection of EPG types and/or blends can obviate the need for the addition of stabilizers (saturated triglycerides) to prevent oil separation in the product. Use of pure liquid EPG as a nut oil substitute does not result in this beneficial effect, as use of pure liquid EPG in a nut butter composition requires the use of a stabilizer to prevent oil separation. Use of pure liquid EPGs as oil substitutes in the nut butter compositions does, however, achieve the caloric reduction of about 9 calories per gram.

A typical peanut butter manufacturing process is used to produce the reduced calorie peanut butter spread of the invention except that certain EPG's are used to replace oils used in roasting or otherwise in preparation of the nut butter. Based on the total weight of the nut butter composition, the EPG content may be up to about 30%, preferably about 15% to about 30%.

Nut butters comprising EPG have good peanut flavor normally associated with inherent oil changes in the nut butter. Conventionally, replacement of peanut oil in a peanut butter composition with a different vegetable or nut oil would be expected to, minimally, result in a loss of flavor or a nut butter with a different flavor altogether. Unexpectedly however, use of certain solid EPG compositions as replacement for the oil does not change the inherent peanut flavor of the nut butter. Thus, the solid EPG compositions can be used as full or partial replacement for oil in the peanut butter, and in particular, can be used as the roasting medium or otherwise, without any loss or change in flavor. Also, it is discovered that, with the use of EPGs having an IV less that or equal to about 10 and a FACN:PO Ratio of about 7 to about 15, a stabilizer is not required to prevent oil separation in the nut butter product and acceptable organoleptic qualities result.

The ingredients of the invention include full-fat peanuts in an amount from about 0% to about 70%, preferably from about 40% to about 70%, most preferably from about 40% to about 60% of the formula. Defatted peanut flours having a fat content from about 0% to about 15% also are employed as a peanut solids source and these can be used in various forms. For example, a peanut flour having from about 0.5% to about 5%, preferably from about 0.5% to about 1% fat can be used, or a peanut flour (partially defatted) having from about 10% to 15%, preferably from about 10% to about 12% fat can be used, or a combination of both can be used. The peanut flour or partially defatted nut flour is used in an amount from about 10% to about 30%, preferably from about 10% to about 25% and most preferably from about 15% to about 25% of the formula. Partially defatted peanuts are used in an amount from about 0% to about 10%, preferably from about 0% to about 5% and most preferably from about 3% to about 5% of the formula. Suitable partially defatted peanut flours are available from Pert Laboratories (division of Seabrook Enterprises) P.O. Box 267, Peanut Drive, Edenton, N.C. 27932 USA, or Golden Peanut Company (in partnership with Universal Blanchers) 1100 Johnson Ferry Road, Suite 900, Atlanta, Ga. 30342 USA.

The fatty acid-esterified propoxylated glycerin compositions of this invention contain glyceryl residues, oxypropylene units, and fatty acid acyl $$-\overset{\overset{\large O}{\|}}{C}R$$

groups. Typically, the compositions are mixtures of individual fatty acid-esterified propoxylated glycerin compounds which may differ from each other in degree of propoxylation and acyl group composition. The glyceryl residue may have the generic structure

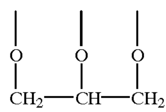

and is derived from glycerin

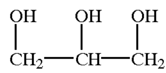

or a glycerin equivalent. The oxypropylene units are generally interspersed between glyceryl residues and the acyl groups and have the structure

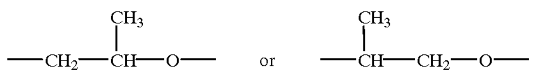

. Typically, more than one oxypropylene unit may be present between an oxygen of an individual glyceryl residue and an acyl group such that a polyoxypropylene unit is created. However, a single "branch" or "arm" of the fatty acid-esterified propoxylated glycerin may contain only one oxypropylene unit. Certain of the acyl groups may be attached directly to the glyceryl residue, without any intervening oxypropylene units, although an average of at least about 3 oxypropylene units per glyceryl residue must be present in the overall composition. The average number of oxypropylene units in the fatty acid-esterified propoxylated glycerin composition is from about 3 to about 12, more preferably from about 3 to about 8. The presence of oxypropylene units alter the melting point of the compositions thereby providing flexibility in achieving the desired product characteristics, such as mouthfeel and melting profile, and physiological characteristics, such as caloric density. An additional advantage to the use of solid EPGs in the nut butter compositions is that it results in a composition that does not have undesirable side effects such as gastrointestinal intolerance and passive oil leakage through the anal sphincter. Also, the use of the solid EPGs obviates the need for a stabilizers in the nut butter product.

In order to maximize the resistance of the fatty acid-esterified propoxylated glycerin composition towards pancreatic lipase enzyme-catalyzed hydrolysis, the oxypropylene units adjacent to the acyl groups should be oriented such that secondary rather than primary ester linkages are created. That is, the methyl group should be located on the carbon atom attached to the oxygen atom forming part of the ester linkage as follows:

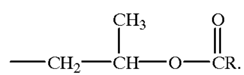

Preferably, at least 80% of the ester linkages in the overall composition are secondary. Most preferably, at least about 95% of the ester linkages are secondary. However, the secondary ester content can be less than about 80% without adversely affecting the properties of the EPGs of the invention.

It is desirable for the fatty acid-esterified propoxylated glycerin composition to be substantially esterified such that it has an average of at least about 2.5 (more preferably, at least about 2.9) fatty acid acyl groups per equivalent of glycerin. The extent of esterification may be readily determined by conventional analytical methods such as hydroxyl number.

The structure of the composition preferably is such that the composition has a porcine pancreatic lipase hydrolysis rate of less than about 10% as compared to an olive oil standard. Preferably, the relative hydrolysis rate is less than about 1% of the olive oil rate. Methods of measuring porcine pancreatic lipase hydrolysis rate are described in White.

The average number of oxypropylene units in the EPG must not be so low as to result in a high proportion of the acyl groups being attached directly to glyceryl residues since such directly attached acyl groups will be nearly as susceptible to enzymatic cleavage as the acyl groups in a conventional fully digestible triglyceride, thus reducing the usefulness of the composition as a low calorie fat substitute. At the same time the average number of oxypropylene units should not exceed about 12.

The melting point for a given EPG may be adjusted as needed by varying the average number of oxypropylene units per glycerin (propoxylation number) present in the composition. At a constant fatty acid acyl group content (i.e., if the relative proportions of the different acyl groups present are fixed), the solid fat index at a particular temperature will increase as the propoxylation number is decreased and will decrease as the propoxylation number is increased. As the average number of fatty acid acyl group carbons per equivalent of glycerin decreases or as the iodine number of the composition increases (as a result of increasing the proportion of unsaturated fatty acid acyl groups present), the average number of oxypropylene units per glycerin will need to be decreased to maintain the solid fat index at a given temperature above a predetermined target value. If a particular fatty acid-esterified propoxylated glycerin composition has an undesirably high solid fat index at a given temperature the index may be brought below a predetermined target value by increasing the propoxylation number. By so adjusting the average number of oxypropylene units per equivalent of glycerin, the melting point of each EPG may be controlled.

Suitable EPGs may be prepared using either fatty acids or fatty acid derivatives such as fatty acid esters, fatty acid halides, or fatty acid anhydrides. Generally speaking, $C_{12}$–$C_{24}$ saturated or unsaturated linear fatty acids and their derivatives can be used as starting materials for preparing the solid compounds, providing that the iodine value (which reflects the proportion of unsaturated fatty acid acyl groups in the composition) must be less than about 30, more preferably is less than about 20, and most preferably is less than about 10 centigrams $I_2$ per gram. A relatively minor proportion of unsaturated fatty acid acyl groups may be advantageous, however, in order to ensure that the composition does not melt over an excessively narrow range. Iodine number (also referred to as iodine value) may be measured by AOCS method Cd 1–25.

The $C_{12}$–$C_{24}$ saturated fatty acid is linear (i.e., nonbranched) and preferably contains only one carboxylic acid functionality. The acyl group may thus correspond to the general structure $$-\overset{O}{\overset{\|}{C}}(CH_2)_nCH_3$$

wherein n is an integer of from 10 to 22. The value of n is most conveniently an even number (e.g., 10, 12, 14, 16, 18, 20, or 22) since the corresponding fatty acids are readily available at low cost from natural sources such as edible oils. Specific illustrative fatty acids suitable for use as this component of the fatty acid-esterified propoxylated glycerin compositions include, but are not limited to lauric acid, myristic acid, stearic acid, palmitic acid, eicosanoic (arachidic) acid, heneicosanoic acid, docosanoic (behenic) acid, tricosanoic acid, and tetracosanoic (lignoceric) acid. Mixtures of these $C_{12}$–$C_{24}$ saturated linear fatty acids may also be utilized to advantage, as discussed above.

While all of the acyl groups in the fatty acid-esterified propoxylated glycerin composition may be derived from $C_{12}$–$C_{24}$ saturated linear fatty acid, the compositions may contain minor amounts of acyl groups derived from other $C_8$–$C_{24}$ fatty acids. Preferably, the proportion of such other acyl groups is less than 40%. Generally speaking, the incorporation of acyl groups which are relatively shorter in length ($C_8$–$C_{18}$), unsaturated, and/or branched will tend to decrease the melting point of the resulting EPG.

The fatty acids which optionally may be used in combination with the required $C_{12}$–$C_{24}$ saturated linear fatty acids may be any of the known fatty acids such as caprylic acid, pelargonic acid, capric acid, oleic acid, cetoleic acid, palmitoleic acid, gadoleic acid, erucic acid, ricinoleic acid, linoleic acid, linolenic acid, myristoleic acid, eleostearic acid, arachidonic acid, or mixtures of these acids. Preferably, linear monocarboxylic acids containing from 0 to 5 double bonds are employed. Increasing the ratio of average number of fatty acid acyl group carbons per equivalent of glycerin will shift the melting point of an EPG to a higher average temperature while decreasing the ratio will shift the melting point to a lower average temperature.

The average number of fatty acid acyl group carbons per equivalent of glycerin in the fatty acid-esterified propoxylated glycerin compositions of the invention may be readily calculated from a knowledge of the fatty acid acyl group content (i.e., the chemical structures and relative proportions of the fatty acids used to prepare the compositions). The following formula may be used to calculate this average number ($N_a$) for an esterified propoxylated glycerin composition prepared using fatty acids A and B:

$$N_a = \frac{\text{moles } A \times \text{no. carbons in } A}{\text{moles propoxylated glycerin}} + \frac{\text{moles } B \times \text{no. carbons in } B}{\text{moles propoxylated glycerin}}$$

For example, a composition prepared by reacting a mixture of 1.5 moles of stearic acid (a $C_{18}$ fatty acid) and 1.5 moles of eicosanoic acid (a $C_{20}$ fatty acid) with 1 mole of propoxylated glycerin containing an average of 7 oxypropylene units per glycerin will have an average of 57 fatty acid acyl carbons per equivalent of glycerin.

To minimize the available caloric content of the fatty acid-esterified propoxylated glycerin nut oil replacement compositions of this invention, the chemical composition should be selected such that the number average molecular weight is at least about 800. More preferably, the minimum molecular weight is about 1000. In order for the fatty acid-esterified propoxylated glycerin composition to function as a suitable replacement for nut oils it is also desirable that the number average molecular weight not exceed about 2200. Preferably, the molecular weight is below about 2000.

EPG compositions having an IV less than or equal to about 10 and a FACN:PO Ratio of about 7 to about 15 are preferred for peanut oil replacement compositions in the nut butter products of the invention. These compositions have the consistency of shortening to a solid substance at ambient temperatures. Use of such EPG compositions eliminates the need for addition of stabilizers, and results in a product that has acceptable orangoleptic characteristics but does not possess the undesirable side effects of gastrointestinal intolerance and passive oil leakage when consumed.

The Iodine Value (IV) of the EPG compound is found to be critical to the product performance of the nut butter compositions. If the iodine value is too high, such that there is a large proportion of unsaturated fatty acids on the molecule, the EPG will have a low melt temperature as measured by AOCS Cd 10–57, resulting in a product that is too soft, requires stabilizer and can lead to passive leakage. EPG compositions having an IV of less than or equal to about ten are discovered to have the appropriate amount of unsaturated fatty acids to alleviate these characteristics. Also, the use of EPG having an IV within these values will result in a product that does not require a stabilizer and does not have undesirable gastrointestinal side effects.

Thus, the EPG compounds useful for the nut butter products tend to have higher levels of saturated fatty acids, and can approach 100% saturated fatty acids. Some amount of unsaturated fatty acids are necessary, however, as compounds with no unsaturated fatty acids would have too sharp of a melting point and the compound would be slow to get to the melting point, thereby negatively affecting the organoleptic properties of the nut butter product.

The relatively low IV, less than or equal to about ten, associated with the EPG compositions useful in the nut butters described herein also minimizes the caloric density of the nut butters. Should some of the EPG composition be hydrolyzed in vivo, the saturated fatty acids in the compounds would tend to crystallize thereby reducing the absorbability of the EPG composition during the digestive process.

While the fatty acid carbon number and melting point have a direct correlation, there is an inverse relationship between the propoxylation number of the EPG compound and the melting point of the compound. Thus, the proper control of the FACN:PO Ratio is necessary to obtain an EPG with the appropriate properties to provide for an organoleptically acceptable product that will not possess undesirable gastrointestinal intolerance and anal leakage and does not require the use of stabilizers. If this ratio is too high the resulting product will be too firm, have a waxy texture and possess poor spreadability. If this ratio is too low, the resulting product will require the use of a stabilizer and could lead to passive anal oil leakage. It is discovered that a FACN:PO Ratio of between 4 and 6 is too low, and a ratio of 30 or above is too high. A FACN:PO Ratio should be between about 7 and about 15 to obtain an acceptable nut butter product, more preferably between about 9 and about 13 and most preferably between about 10 and about 12.

Accordingly, the EPG compositions must have an IV less than or equal to about 10 and a FACN:PO Ratio of between about 7 and about 15, more preferably between about 9 and about 13 and most preferably between about 10 and about 12. These EPG compositions will have a solid fat index of greater than or equal to about 50 at 80° F. Nut butters wherein the oil is replaced with these EPG compositions do not require the use of a stabilizer, minimize or eliminate the undesirable characteristics of gastrointestinal intolerance and anal leakage and will have acceptable organoleptic characteristics.

As discussed above, EPG-05 9HR/1LS (IV=4), synthesized using about 90% hydrogenated rapeseed and about 10% liquid soybean fatty acids, and FHEPG-05 soyate made from fully hydrogenated soybean fatty acids are particularly suitable for the nut butter products described herein. EPG compositions synthesized using stearic acid fatty acids, and propoxylation numbers of about 4 to about 5 are also suitable for the invention. EPG compositions having propoxylation numbers of about 8 synthesized using from about 25% to about 75% behenic acid and from about 75% to about 25% stearic acid are suitable. Sources of behenic acid and stearic acid are well known. Other useful EPG compositions are those having propoxylation numbers of about 8 and synthesized using from about 50% to about 75% behenic acid and from about 50% to about 25% fatty acids from soybean; those having propoxylation number of about 8 and synthesized using from about 50% to about 75% behenic acid and from about 50% to about 25% fatty acids from cocoa oil; those having propoxylation numbers of about 5 and synthesized using from about 33% to about 85% hydrogenated rapeseed fatty acids and from about 67% to about 15% stearic acid; and those having propoxylation numbers of between about 5 and about 8 and synthesized from acids from hydrogenated rapeseed oil. These EPG compositions are suitable when formulated to have an IV less than or equal to about 10 and a FACN:PO Ratio of about 7 to about 15.

The fatty acid-esterified propoxylated glycerin nut oil replacement compositions of this invention may be prepared using any suitable method. In general, the procedures described in the prior art for synthesizing other fatty acid-esterified propoxylated glycerin compositions will be appropriate for use provided that the necessary $C_{12}$–$C_{24}$ saturated linear fatty acids or fatty acid derivatives are employed in the esterification step. Such procedures are described, for example, in U.S. Pat. Nos. 4,861,613 (the White patent, referenced above) and 4,983,329 and in European Patent Publication No. 353,928, the disclosures of which are incorporated by reference herein in their entirety. As is explained in more detail in the above-mentioned publications, either fatty acids or fatty acid equivalents such as fatty acid esters, fatty acid halides, or fatty acid anhydrides may actually be employed in the esterification. The $C_{12}$–$C_{24}$ saturated linear fatty acid acyl groups may also be introduced by using $C_{12}$–$C_{24}$ unsaturated fatty acids in the esterification step and then hydrogenating the esterified propoxylated glycerin composition to increase the proportion of $C_{12}$–$C_{24}$ saturated linear fatty acid acyl groups to the desired level. Any residual free fatty acid remaining in the composition after esterification should preferably be removed or reduced as much as possible to minimize problems with off flavor, off-odor, or storage stability.

The fatty acid-esterified propoxylated glycerin compositions of the present invention are particularly suitable for use as replacements for nut oils such as peanut oil of the type conventionally used in preparing nut butters such as peanut butter. The EPG compositions may be used to replace conventional fat as the roasting medium in formulating the nut butter compositions or used otherwise, such as directly blended or mixed with other nut butter ingredients prior to or after roasting.

In addition to the fat component comprised of the fatty acid-esterified propoxylated glycerin composition, the process and product of the invention may further comprise one or more other conventional ingredients. The conventional ingredients include but are not limited to full fat nuts, partially defatted nuts, nut flour, natural and/or artificial sweeteners, carbohydrate solids, salt, flavorants and other additives such as nut chunks and flavored candies and bits, and the like.

Further caloric reduction can be attained in the formula through the use of low calorie bulking agents contributing about 0–1.5 calories per gram. They can include such bulking agents as polydextrose LITESSE® from Cultor Food Science, inulin RAFTILINE® from Rhone Poulenc, Food Ingredients Division, 1130 East Maiden Street, Washington, Pa. 15301 USA, or FRUTAFIT® from Imperial Suiker Unie, One Imperial Square, P.O. Box 9, Sugarland, Tex. 77487 USA and microcrystalline cellulose AVICEL® or INDULGE™ from FMC Corp., Food Ingredients Division, 1735 Market Street, Philadelphia, Pa. 19103 USA. Maltodextrin may also be used as a low calorie bulking agent.

Sweeteners and other carbohydrate solids such as sugar, corn syrup solids or high potency sweeteners can be used alone or in combination from about 0% to about 5% of the formula. When the sweetener is sugar, for example, it is added in an amount from about 2% to about 5%, preferably from about 2% to about 3%. Other conventional natural sweeteners can be employed such as honey and dextrose, and other carbohydrate solids can be employed such as maltodextrins and starches. Artificial sweeteners such as ASPARTAME® also can be used for further caloric reduction. The amount of natural and/or artificial sweeteners employed will vary depending upon the sweetness desired as will be apparent to those skilled in the art.

The reduced calorie peanut butter can also contain salt. The salt is used in an amount from about 1% to about 2%.

The spreadability of the peanut butter after mixing and particle size reduction steps, is about 21 to about 27 millimeters at 70° F. as determined using the penetrometer (Precision Universal Model with ASTM grease cone D-217 and 150 g plunger loading). The density of the peanut butter is a maximum of about 1.2 grams/cc, with a target density of about 1.1 to about 1.2 grams/cc. This criteria ensures a 32 gram weight serving for 30 mls (two tablespoons) and allows for a 50% caloric reduction label claim where volume declaration of serving size is mandated.

The nut butter compositions comprising EPG may be made by methods known in the art for making conventional nut butters. The reduced calorie peanut butters comprising EPG however, may be made by the following procedure. Peanut slurry is obtained by milling full fat or partially defatted peanuts. The slurry may be obtained through one or a number of passes through a mill. Defatted peanut flour, salt, sweeteners and other additives may be then mixed with the peanut slurry to obtain a mixture, and this mixture may be milled to obtain the desired texture, such as smooth or chunky. The slurry, or if the aforementioned additives are mixed the mixture, is then heated to a temperature of at least, about, 160° F. Heating may occur under constant agitation in a mixer. During the heating process the EPG is added to the peanut slurry or peanut slurry mixture, and the peanut slurry or peanut slurry mixture comprising EPG is further mixed at temperature to form a raw nut butter product. The raw nut butter product may be further processed by removing air by means of applying a vacuum to the heated raw nut butter product to obtain a finished nut butter product. The finished nut butter product may then be cooled and packaged, such as being placed in jars.

EXAMPLES

The EPGs utilized in the examples were EPG-05 9HR/1LS (IV=4) and synthesized using hydrogenated rapeseed (90%) and liquid soybean (10%) fatty acids. The resulting materials were physically refined, hydrogenated to near saturation, bleached and then deodorized. The deodorized products were fortified with a mixed tocopherol blend of 50% Covi-ox T70 and 50% Covitol F1300 (available from Henkel Corp., La Grange, Ill. U.S.A.) to a level of up to about 0.16%. The finished products were characterized using analytical methods commonly used by the industry to evaluate oils and fats. These methods included Wijs iodine value (AOCS Cd 1–25), Mettler dropping point (AOCS Cc 18–80 (93)) and solid fat index (AOCS Cd 10–57). The EPGs used in the nut butters of the examples had an Iodine Value of about 4 and an FACN:PO Ratio of about 12, a Mettler dropping point of about 109° F. and a solid fat index of about 73 at 50° F., about 58 at 80° F., about 42 at 92° F. and about 1.5 at 104° F.

Comparative Example (Control)

A conventional peanut butter composition, including stabilizers, was made by traditional milling methods. The composition is identified as control on Tables 1 and 2. The conventional peanut butter had 205 calories per 32 gram serving and 17 grams of fat as illustrated in Table 2.

Examples 1–7

In each of Examples 1–7 double milled peanut slurry was obtained by conventional milling methods. The peanut slurry was then mixed with defatted peanut flour, sucrose (sugar) and salt and then milled using a roller mill to obtain the desired texture. The milled mixture was then placed into a vessel and heated under constant agitation to a temperature of about 160° F. When the temperature of about 160° F. was attained, EPG was added to the vessel under agitation and agitation continued for around 15 to 20 additional minutes. A vacuum was then placed over the vessel contents for about 15 to 20 minutes to remove air from the nut butter. The vacuum was removed when air bubbles were no longer observed on the surface of the product. Afterwards, the product was cooled to about 75° F. and placed in jars.

Table 1 illustrates the compositions of the nut butters of each example. The formulations of Examples 1–7 have an EPG content of about 15% to about 30%. Table 1 also illustrates the component weight and caloric contribution of the components of the nut butters per 32 gram serving for the Control and Examples 1–7.

As illustrated in Table 2, the peanut butters comprising from about 15% to 30% EPG have from about 120 to about 160 calories per 32 gram serving, compared to 205 calories for the control nut butter without EPG. Thus, the nut butters comprising EPG have about a 20% to 40% calorie reduction compared to full fat and full calorie products. Also, the EPG nut butter products had from about 25% to about 60% less fat than conventional nut butter.

The Control and Examples 1, 3, 4, 6 and 7 were observed for oil separation, flavor and texture. The control, which comprised stabilizers, understandably had no oil separation. The nut butters comprising EPG, which do not comprise stabilizers, unexpectedly had none or only slight oil separation. The EPG nut butters had good flavor similar to conventional nut butter (Control). All of the nut butters had acceptable texture, however, those having from about 26.5% to 30% EPG were observed as having waxy texture. Thus, more organoleptically acceptable products may have an EPG content of about 15% by weight to about 25% by weight.

TABLE 1

| | Formula (Weight %) | | | | | Component Weight & Caloric Contribution per Serving (32 g) | | | | | |
|---|---|---|---|---|---|---|---|---|---|---|---|
| | | | | | | Fat | | Protein | | Carbohydrate | |
| Examples | Peanut Slurry | Defatted Peanut Flour | EPG | Sugar | Salt | Wt. (g) | Cal. (Kcal) | Wt. (g) | Cal. (Kcal) | Wt. (g) | Cal. (Kcal) |
| Control | 90.5 | 0 | 0 | 6.5 | 1.2 | 17.0 | 150.8 | 7.0 | 28.0 | 7.0 | 28.0 |
| 1 | 69.3 | 11.8 | 15.1 | 2.5 | 1.3 | 12.5 | 112.3 | 8.5 | 34.1 | 3.6 | 14.6 |
| 2 | 58.5 | 20.0 | 18.0 | 2.5 | 1.0 | 11.0 | 99.1 | 8.9 | 35.5 | 4.8 | 19.0 |
| 3 | 53.5 | 25.0 | 18.0 | 2.5 | 1.0 | 10.4 | 93.2 | 9.2 | 36.8 | 4.9 | 19.6 |
| 4 | 58.5 | 18.0 | 20.0 | 2.5 | 1.0 | 11.0 | 98.7 | 8.6 | 34.2 | 4.6 | 18.4 |
| 5 | 56.5 | 20.0 | 20.0 | 2.5 | 1.0 | 10.7 | 96.4 | 8.7 | 34.7 | 4.7 | 18.7 |

TABLE 1-continued

| | Formula (Weight %) | | | | | Component Weight & Caloric Contribution per Serving (32 g) | | | | | |
|---|---|---|---|---|---|---|---|---|---|---|---|
| | | | | | | Fat | | Protein | | Carbohydrate | |
| Examples | Peanut Slurry | Defatted Peanut Flour | EPG | Sugar | Salt | Wt. (g) | Cal. (Kcal) | Wt. (g) | Cal. (Kcal) | Wt. (g) | Cal. (Kcal) |
| 6 | 39.0 | 31.0 | 26.5 | 2.5 | 1.0 | 8.3 | 74.5 | 8.8 | 35.2 | 4.7 | 18.9 |
| 7 | 40.8 | 26.0 | 30.0 | 2.5 | 0.8 | 6.9 | 63.8 | 9.4 | 37.6 | 4.7 | 18.8 |

TABLE 2

| | Nutritional Information | | | | Observations | | |
|---|---|---|---|---|---|---|---|
| Finished Product | Total Calories | Total Fat (grams) | Caloric Reduction | Fat Reduction | Oil Separation | Flavor | Texture |
| Control | 205.0 | 17.0 | — | — | None | Good | Smooth |
| 1 | 161.0 | 12.5 | 21.4 | 26.6 | Slight | Good | Sl. Soft |
| 2 | 153.6 | 11.0 | 25.3 | 33.8 | | | |
| 3 | 149.6 | 10.4 | 27.2 | 37.8 | None | Good | Firm |
| 4 | 151.3 | 11.0 | 26.4 | 34.1 | Slight | Good | Smooth |
| 5 | 149.7 | 10.7 | 27.1 | 35.6 | | | |
| 6 | 128.5 | 8.3 | 37.5 | 50.2 | None | Good | Waxy |
| 7 | 120.2 | 6.9 | 41.4 | 59.5 | None | Good | Waxy |

What is claimed is:

1. A reduced calorie and reduced fat nut butter composition comprising a) up to about 70% by weight full fat nuts, b) from about 10% by weight to about 30% by weight of defatted or partially defatted nut flour having about 0.5% by weight to about 15% by weight fat content, and c) from about 15% by weight to about 30% by weight of an EPG having an IV less than or equal to about 10 and a FACN:PO Ratio of between about 7 and about 15 wherein stabilizer is not required in the nut butter composition to prevent oil separation.

2. The composition of claim 1 wherein the nut butter is peanut butter.

3. The composition of claim 1 further comprising up to about 10% by weight partially defatted nuts.

4. The composition of claim 1 further comprising bulking agents.

5. The composition of claim 1 further comprising up to about 5% by weight of a sweetener.

6. The composition of claim 1 further compromising about 1% by weight to about 2% by weight salt.

7. The composition of claim 1 where in said FACN:PO Ratio is between about 9 and about 13.

8. The composition of claim 1 wherein said FACN:PO Ratio is between about 10 and about 12.

9. The composition of claim 1 wherein the content of said EPG is from about 15% by weight to about 25% by weight.

10. The composition of claim 1 where the content of said full nuts is from about 40% by weight to about 70% by weight.

11. The composition of claim 1 wherein said EPG has a propoxylation number from about 3 to 12.

12. The composition of claim 1 wherein said EPG has a PO of about 5, an IV of about 4 and a FACN:PO Ratio of about 12 and is synthesized using about 90% by weight hydrogenated rapeseed and about 10% by weight soybean fatty acids.

13. The composition of claim 1 wherein said EPG has a PO of 5 and is synthesized using fully hydrogenated soybean fatty acid.

14. The composition of claim 1 wherein said EPG has a molecular weight of between about 800 and about 2200.

15. The composition of claim 1 having a spreadability of about 21 to about 27 millimeters at about 70° F.

* * * * *